March 11, 1947. L. A. WILLIAMS, JR 2,417,185
ANTI-ICING COMBUSTION AIR SCOOP
Filed July 1, 1943   4 Sheets-Sheet 4

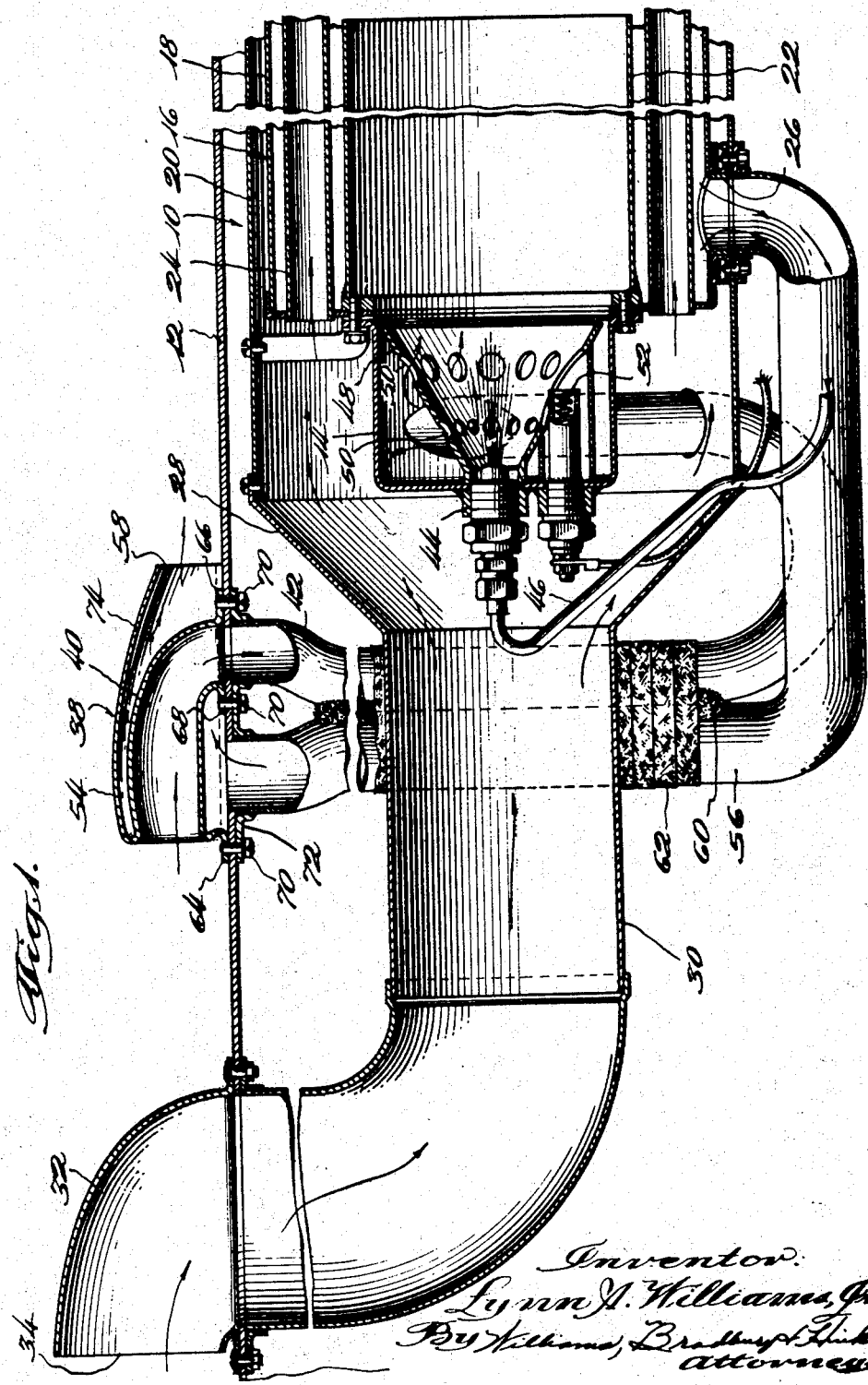

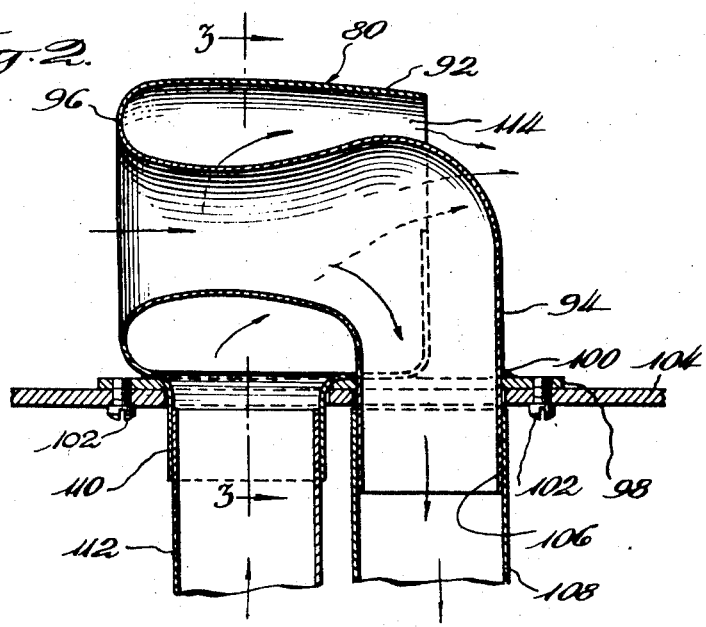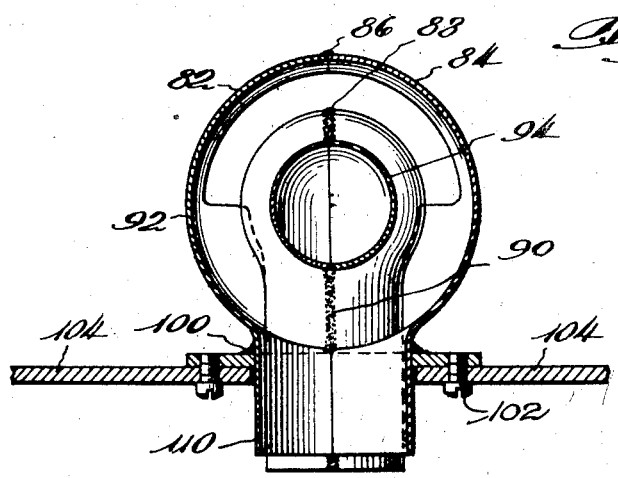

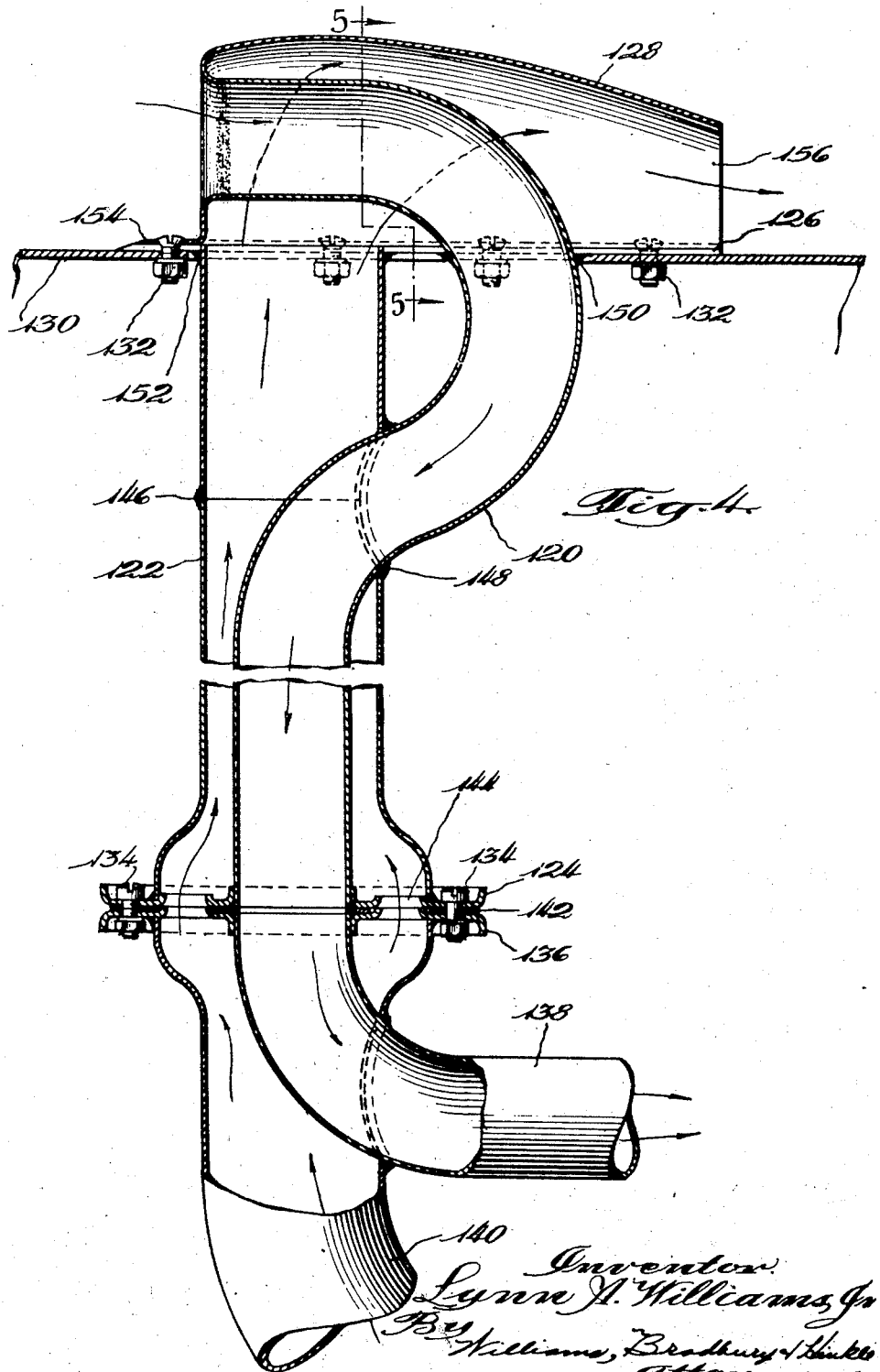

Inventor:
Lynn A. Williams, Jr.
By Williams, Bradbury & Hinkle
Attorneys

Patented Mar. 11, 1947

2,417,185

UNITED STATES PATENT OFFICE 2,417,185

ANTI-ICING COMBUSTION AIR SCOOP

Lynn A. Williams, Jr., Northfield, Ill., assignor to Stewart-Warner Corporation, Chicago, Ill., a corporation of Virginia Application July 1, 1943, Serial No. 493,040

6 Claims. (Cl. 126—110)

1

My invention relates to anti-icing combustion air scoops particularly designed to form part of the installation of internal combustion heaters on aircraft.

It is now common to install internal combustion types of heaters on aircraft to supply heat to the cabin and other spaces in the aircraft where heat is desired. It is usual to supply combustion air and ventilating air for the heater from a ram or rams so positioned that operation of the aircraft causes these rams to force air to the heater. In those installations in which a separate ram is provided for supplying combustion air for the heater, particular difficulty has been encountered as the result of ice formation and accumulation in this basin or ram, as such formation and accumulation interferes with and may completely cut off the supply of combustion air to the heater. An object of my invention is to overcome this difficulty.

It is also desirable to heat the combustion air for the airplane heater to a very appreciable extent before this air is introduced into the heater in order to facilitate vaporization of the fuel and thorough mixing of the fuel and combustion air to form a highly efficient combustible mixture.

Another object of my invention is to provide means for adequately heating this combustion air to produce more complete and efficient combustion.

Another object of my invention is to provide an anti-icing combustion air scoop which is light in weight, inexpensive to manufacture and which may be readily installed on existing types of aircraft.

Another object of my invention is to provide a new and improved anti-icing combustion air scoop which offers a minimum resistance to forward movement of the aircraft.

Other objects and advantages will become apparent as the description proceeds.

In the drawings:

Fig. 1 is a sectional view through part of an aircraft heater installation embodying my invention;

Fig. 2 is a sectional view of a part of an aircraft heater installation utilizing a different form of anti-icing combustion air scoop from that shown in Fig. 1;

Fig. 3 is a transverse, sectional view taken on the lines 3—3 of Fig. 2;

Fig. 4 is a sectional view through part of a third form of aircraft heater installation;

2

Figure 5:
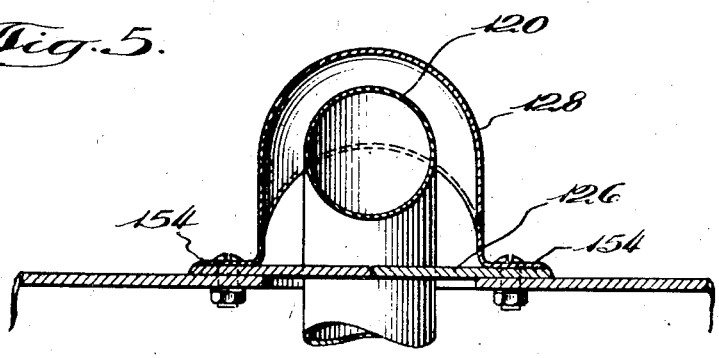

Fig. 5 is a transverse section taken on the line 5—5 of Fig. 4; and

Figure 6:
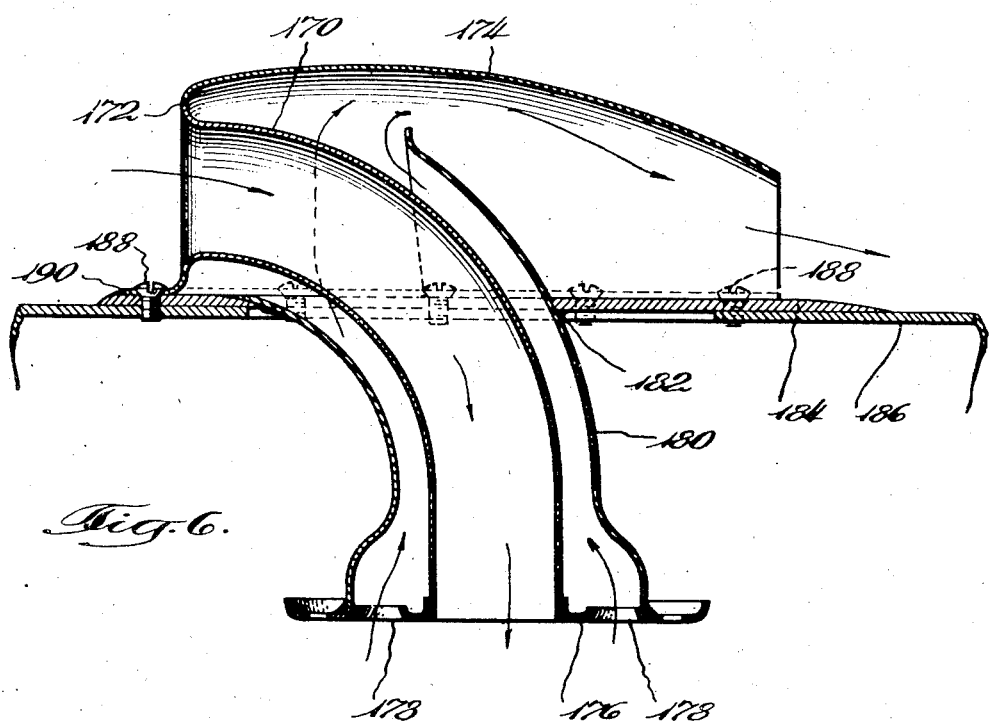

Fig. 6 is a section through a part of a fourth type of heater installation.

The installation shown in Fig. 1 comprises an internal combustion type of heater 10 mounted by any suitable means adjacent a wall 12 of the cabin or other part of an aircraft. The heater 10 has a combustion chamber 14 which furnishes hot products of combustion to one end of a heat exchanger indicated generally by reference numeral 16. The heat exchanger 16 has an outer wall 18 spaced inwardly of the heater casing 20 and an inner sleeve 22 whose righthand end terminates short of the righthand end of the heat exchanger.

A circumferentially arranged row of ventilating air tubes 24 is located between the outer wall 18 and the sleeve 22. The ventilating air tubes 24 are preferably spaced from each other and from the wall 16 and sleeve 22 so that hot products of combustion can flow freely around and between these ventilating air tubes. The heat exchanger shown is of the reverse flow type in which the hot products of combustion issuing from the combustion chamber 14 first traverse the interior of the sleeve 22 and then turn backwardly around the righthand end of this sleeve to flow backwardly to the outlet opening 26 provided in the outer wall 18 of the heat exchanger 16.

The heater casing 20 has a tapered inlet end 28 forming part of a ventilating air inlet pipe 30 which is supplied with ventilating air by a ram 32 projecting outwardly from the wall 12 of the aircraft structure. The ram 32 has its inlet end 34 so positioned and directed that operation of the aircraft creates circulation of air through this ram and through the heater casing 20.

The ventilating air entering the lefthand end of the heater casing 20 absorbs some heat from the walls of the combustion chamber and additional heat from the heat exchanger 16. Part of the ventilating air passes through the annular passageway 36 formed between the heater casing 20 and the outer wall 18 of the heat exchanger, whereas the remainder of this ventilating air flows through the ventilating air tubes 24. The heated ventilating air is discharged from the righthand end of the heater into a cabin or other space to be heated or into a duct system having outlets located in the same or different spaces. It will be understood that the particular form of heat exchanger shown in Fig. 1 has been selected for purposes of illustration only and that other forms of heat exchangers may be used in lieu thereof.

Combustion air for the combustion chamber 14 is supplied by a ram or combustion air scoop indicated generally by reference character 38. This scoop has a combustion air passage 40 communicating with a pipe 42 leading to the combustion chamber 14 and delivering air to the combustion chamber in a direction tangential to the wall of that chamber. In the particular combustion chamber selected for purposes of illustration, fuel is supplied through a nozzle 44 connected by pipe 46 with any suitable source of fuel. A frusto-conical plate 48 is located in the combustion chamber 14 and has openings 50 through which the combustion air passes and which serve to facilitate admixture of this air with the fuel delivered by the nozzle 44. The usual electrical igniter 52 is provided to initiate combustion. The particular arrangement of the combustion chamber and fuel mixing means is shown only by way of example and other types of combustion chamber and fuel mixing means may be used in lieu of those shown in this figure.

From Fig. 1 it appears as though the combustion air inlet scoop 38 were located directly behind the ram 32 for the ventilating air. The drawing is diagrammatic, however, in this respect and it is to be understood that the scoop 38 is preferably located out of alignment with the ram 32 or is otherwise so positioned that the ram 32 has no effect on the quantity of combustion air entering the scoop 38. This scoop 38 supplies only combustion air to the heater 10. Since relatively little combustion air is required by this heater, air inlet passage 40 in the scoop 38 has a relatively small diameter and might easily become partially or completely closed by accumulation of ice therein where the airplane is operating under certain atmospheric conditions. Because of the small diameter of the inlet passage 40, any appreciable accumulation of ice therein would seriously interfere with the operation of the heater and it is extremely important to prevent the accumulation of ice in this combustion air inlet and an important feature of my invention lies in the means for preventing such accumulation of ice.

The combustion air scoop 38 is especially designed to provide an annular jacket 54 completely surrounding the combustion air inlet 40 and this jacket 54 is connected by a pipe 56 with the heater exhaust outlet 26 whereby all products of combustion leaving the heater flow through the pipe 56 to the jacket 54. The products of combustion leaving the heater contain sufficient heat to prevent ice formation in the combustion air inlet 40 and thus insure free passage of combustion air through this inlet to the heater 10. These exhaust gases are discharged to atmosphere through an exhaust opening 58 formed in the righthand end of the scoop 38. This opening is so positioned relative to the air flow around the sides of the scoop 38 as to provide minimum resistance to forward movement of the aircraft.

While it is of the utmost importance to prevent accumulation of ice in the combustion air inlet, it is also desirable to preheat the combustion air sufficiently to aid materially in the vaporization of the fuel and in the admixture of fuel and air to produce a combustible mixture which will burn efficiently. The combustion air is preheated to some extent as it flows through the inlet 40 in the scoop 38, but I find it desirable to provide additional preheating of this combustion air.

I have accordingly shown the combustion air inlet pipe 42 and the exhaust pipe 56 as having parallel sections which are welded together as indicated at 60 to facilitate the transfer of heat therebetween to further preheat the combustion air. These parallel portions of the pipes 42 and 56 may also be wrapped with insulating material 62 to minimize the escape of heat therefrom. If that portion of the inlet pipe 42 between the insulated wrapping 62 and the combustion chamber 14 is of appreciable length, it may also be desirable to wrap this section of the inlet pipe with insulating material.

The anti-icing scoop 38 is preferably formed as a single casting in the form of a housing or hood, although it may be made of several parts welded or otherwise secured together. This scoop is illustrated as being provided with flanges 64, 66 and 68 which are tapped to receive screws 70 for securing the scoop to the wall 12. As shown in Fig. 1, these screws 70 also secure to the wall 12 a plate 72 to which the adjacent ends of the pipes 42 and 56 are welded or otherwise suitably secured. It should be noted that the outer wall 74 of the scoop is streamlined to minimize air resistance and that this streamlining merges with exhaust outlet 58 through which the heater exhaust is finally discharged to atmosphere.

The particular design of anti-icing combustion air scoop shown in Fig. 1 is inexpensive to manufacture, light in weight, easy to install, and offers little resistance to air flow therepast. This particular design is satisfactory for most installations, but for other installations other designs of air scoops may be desirable. In Figs. 2 to 6, inclusive, I have shown other designs of air scoops which may be used in lieu of that shown in Fig. 1. These other designs are particularly adapted for certain installations and lend themselves especially to particular manufacturing techniques and equipment.

In Figs. 2 and 3, I have shown an air scoop indicated generally by reference character 80 and formed of two half sections 82 and 84 welded together, as indicated at 86, 88 and 90, to form a unitary whole. Each half section has a half of the tubular jacket 92 and a half of the air inlet pipe 94. The extreme inlet end of the air inlet pipe 94 is welded to the adjacent end of the jacket 92, as indicated by reference character 96 in Fig. 3. Immediately back of its extreme forward end, the air inlet is given a curved or Venturi-like shape.

The air scoop 80 is provided with a base 98 which is welded to the inlet pipe 94 and jacket 80, as indicated at 100. This base is tapped to receive screws 102 for attaching the scoop to the wall 104 of the aircraft. The inlet pipe 94 has a downwardly extending end 106 which enters the upper end of a pipe 108 leading to the combustion chamber, carburetor, or other fuel mixing means. The jacket 92 has a downwardly extending exhaust inlet 110 adapted to receive the upper end of an exhaust pipe 112 connected with the exhaust outlet of the heater. The exhaust jacket 92 and adjacent end of the inlet 94 are suitably curved, as best shown in Fig. 2, to offer a minimum resistance to air flow and the righthand end of the jacket 92 terminates in an exhaust outlet 114 through which the exhaust gases pass to atmosphere.

In the embodiment of Figs. 2 and 3 the exhaust jacket is somewhat shorter than the air inlet portion of the scoop and this arrangement is designed to afford somewhat less preheating of the combustion air than is provided in the form of scoop shown in Fig. 1. The several parts of the scoop shown in Figs. 2 and 3 may be made of relatively thin, light weight metal, or of any other suitable metal or material, by stamping or in any other suitable manner. The stamped or otherwise formed parts are then welded to form the completed scoop.

The anti-icing scoop shown in Figs. 4 and 5 constitutes a unitary structure comprising an air inlet pipe 120, a two-part exhaust pipe 122, an end plate 124 welded to the lower ends of the inlet and exhaust pipes, a two-piece plate 126 welded to the inlet and exhaust pipes adjacent the upper end of the latter pipe, and an exhaust jacket 128 welded to the inlet end of the inlet pipe 120. The entire assembly is illustrated as being secured to the wall 130 of the airplane cabin or other structure by means of nuts and bolts 132.

The lower end of the scoop assembly is secured by nuts and bolts 134 to a second assembly comprising an end plate 136, an air inlet pipe 138, and a heater exhaust pipe 140. The pipe 138 serves to conduct combustion air to the heater carburetor or other fuel mixing means. A gasket 142 of asbestos or other suitable material is clamped between the plates 124 and 136 and these plates and gasket have suitable openings 144 through which the heater exhaust can pass, as shown in Fig. 4.

The various elements of the novel scoop shown in Figs. 4 and 5 may be made of any suitable material and may be assembled in the following or any other suitable manner. The lower end of the inlet pipe 120 is inserted in the lower section of the exhaust pipe 122 and plate 124 is secured to the lower ends of each of these pipes. The upper section of exhaust pipe 122 is then placed upon the lower section of this pipe and the two sections welded together as indicated at 146.

The inlet pipe 120 is then welded to the joint sections of the exhaust pipe, as indicated at 148. The two sections of plate 126 are next welded to the upper portions of the inlet and exhaust pipes, as indicated respectively by reference characters 150 and 152. The abutting edges of the two parts of the plate 126 are also preferably welded together to prevent escape of exhaust gas into the interior of the aircraft. The opening in the wall of the aircraft must be large enough to receive the end plate 124 and after this plate and the lower ends of the inlet and exhaust pipes have been passed through the wall opening, the scoop is secured to the wall by the nuts and bolts 132 which pass through the plate 126 and also through over turned edges 154 of the jacket 128.

In the embodiment of Figs. 4 and 5, the combustion air is heated as it passes through that portion of the inlet pipe 120 which is located in the exhaust jacket 128, so that no ice formation will occur in this pipe and any ice contained in the entering air will be prevented from accumulating in the pipe. Further preheating of the combustion air occurs in that portion of pipes 120 and 128 which are located in exhaust pipes 122 and 140. It should be noted that the exhaust is discharged into the jacket 128 immediately adjacent the leading edge thereof so that this edge is properly heated to prevent formation or accumulation of ice on this edge. The jacket 128 is streamlined and terminates in an exhaust outlet 156.

The anti-icing combustion air scoop shown in

Fig. 6 is a modification of that shown in Figs. 4 and 5. In this embodiment of my invention, the inlet end of the combustion air pipe 170 is welded as indicated at 172 to the forward end of the exhaust jacket 174. The other end of the combustion air pipe 170 is welded or otherwise suitably secured to an end plate 176 containing openings 178 for passage of exhaust gases therethrough. An exhaust pipe 180 surrounds the major portion of the combustion air pipe 170, but has its upper end terminating at some distance from the forward end of the combustion air pipe and exhaust jacket whereby the exhaust gases pass from the exhaust pipe 180 into the forward end of the exhaust jacket 174.

Both the combustion air pipe and the exhaust pipe are preferably curved, as shown, and this curvature of the exhaust pipe causes the exhaust gases to be discharged from this pipe toward the weld 172, whereby the curved forward ends of the combustion air pipe and jacket 174 receive a maximum amount of heat. The exhaust pipe 180 is welded, as indicated at 182, to a plate 184 forming a part of the unitary scoop. This scoop is secured to an aircraft wall 186 by means of screws 188 which pass through the plate 184 and flanges 190 formed from an integral part of the exhaust jacket 174.

All of the several forms of combustion air scoops which I have illustrated and described may be easily manufactured with conventional equipment and by conventional manufacturing methods. These several scoops may be made of aluminum, stainless steel, or any other suitable material. It is to be understood that my invention is not limited to the particular details shown and described but may assume numerous other forms and that my invention includes all modifications and variations falling within the scope of the appended claims.

I claim:

1. An anti-icing air scoop, comprising a unitary casting having a flange for attachment to a wall of an aircraft, said casting providing an air inlet passage having an opening adapted to face forwardly upon an aircraft and a space for exhaust gases completely surrounding said air inlet passage substantially to said opening and open at the rear to the atmosphere, said casting being adapted to project into an air stream created by operation of said aircraft and having a streamlined exterior surface to minimize air resistance.

2. An aircraft heater installation, comprising an aircraft, a heater on said aircraft and having a combustion chamber and a heat exchanger for receiving hot products of combustion from said chamber, passage forming means including an opening to atmosphere directed toward the front of the aircraft to supply combustion air only to said chamber, other means for supplying ventilating air to said heat exchanger, an exhaust jacket surrounding the portion of said passage forming means adjacent said opening, a pipe for conducting exhaust gases from said heat exchanger to said jacket adjacent to said opening, and a flange integral with said means and jacket, said flange being adapted for attachment to a wall of the aircraft.

3. An aircraft heater installation, comprising an aircraft, a heater on said aircraft and having a combustion chamber and a heat exchanger for receiving hot products of combustion from said chamber, a scoop device opening to atmosphere toward the front of the aircraft, a jacket surrounding the forward portion of said scoop device to a point immediately adjacent the entrance thereto, said jacket being open to the atmosphere at its rear portion, a pipe connecting said scoop device with the combustion chamber of the heater to deliver air thereto, and a second pipe connecting the forward portion of said jacket with said heat exchanger to deliver exhaust gases to said jacket, said two pipes being in close proximity to each other for causing a transfer of heat from the exhaust gases in said second pipe to the air in said first named pipe.

4. An air inlet scoop for an aircraft heater, comprising a scoop device having an inlet opening, and a jacket in the form of a housing for mounting the scoop device in operative position on the outer face of a wall portion of an aircraft and closed at its forward end about the scoop device and open at its rear end to the atmosphere so that said jacket encloses said scoop device substantially to the inlet opening, said jacket being provided with an opening at its forward portion for connection of an exhaust pipe to the jacket.

5. A heater installation of the class described, comprising a heater having a combustion chamber and heat exchanger for receiving hot products of combustion from said chamber, an anti-icing scoop adapted to project from the body of a vehicle containing said heater, said scoop comprising an exhaust jacket, said jacket having a closed forward end and an open rear end, an exhaust pipe connecting said heat exchanger with the forward portion of said exhaust jacket whereby exhaust gases are conveyed to said jacket, a combustion air pipe for conveying combustion air to said combustion chamber having an inlet end portion extending forwardly through the jacket and attached to the forward end of said jacket, and separate means for supplying ventilating air to said heater.

6. An anti-icing air scoop, comprising a unitary structure having a fitting for attachment to a wall of an aircraft, said structure providing an air inlet passage having an opening adapted to face forwardly upon an aircraft and a space for exhaust gases completely surrounding said air inlet passage substantially to said opening and open at the rear to the atmosphere, said structure being adapted to project into an air stream created by operation of said aircraft and having a streamlined exterior to minimize air resistance.

LYNN A. WILLIAMS, JR.

REFERENCES CITED

The following references are of record in the file of this patent:

UNITED STATES PATENTS

| Number | Name | Date |
|---|---|---|
| 658,169 | Avery | Sept. 18, 1900 |
| 901,075 | Darroch | Oct. 13, 1908 |
| 1,918,568 | Schirmir | July 18, 1933 |
| 1,982,747 | Kurth | Dec. 4, 1934 |
| 171,409 | Moyer | Dec. 21, 1875 |
| 1,965,158 | Rogliano | July 3, 1934 |
| 2,130,385 | Fluor, Jr., et al. | Sept. 20, 1933 |
| 286,341 | Spear | Oct. 9, 1883 |
| 4,392 | Chase | Mar. 7, 1846 |
| 1,420,142 | Pennington | June 20, 1922 |

FOREIGN PATENTS

| Number | Country | Date |
|---|---|---|
| 5,795 | British | Apr. 28, 1886 |
| 719,320 | French | Nov. 14, 1931 |
| 12,056 | British | 1885 |
| 217,701 | British | June 26, 1924 |
| 106,292 | German | Nov. 7, 1899 |